(12) United States Patent
Kawakita et al.

(10) Patent No.: US 7,238,914 B2
(45) Date of Patent: Jul. 3, 2007

(54) LASER PROCESSING METHOD

(75) Inventors: Masato Kawakita, Fujimi (JP); Kouji Ishii, Kawagoe (JP); Shinji Numata, Sakado (JP); Kazuya Hirohashi, Saitama (JP)

(73) Assignee: Nissan Tanaka Corporation, Saitama-ken (JP)

( * ) Notice: Subject to any disclaimer, the term of this patent is extended or adjusted under 35 U.S.C. 154(b) by 0 days.

(21) Appl. No.: 11/119,239

(22) Filed: Apr. 29, 2005

(65) Prior Publication Data
US 2005/0274703 A1 Dec. 15, 2005

(30) Foreign Application Priority Data
May 7, 2004 (JP) .............................. 2004-138324

(51) Int. Cl.
*B23K 26/08* (2006.01)
*B23K 26/06* (2006.01)
(52) U.S. Cl. .............................. 219/121.78; 219/121.74
(58) Field of Classification Search ........... 219/121.74, 219/121.78, 121.84
See application file for complete search history.

(56) References Cited

U.S. PATENT DOCUMENTS

| | | | | |
|---|---|---|---|---|
| 4,973,819 A | * | 11/1990 | Thatcher ................ | 219/121.78 |
| 5,089,683 A | * | 2/1992 | Stephenson et al. ... | 219/121.78 |
| 5,237,151 A | * | 8/1993 | Maruyama ............. | 219/121.78 |
| 5,406,048 A | * | 4/1995 | Yamazaki et al. ..... | 219/121.78 |
| 5,560,843 A | * | 10/1996 | Koike et al. ........... | 219/121.67 |
| 7,002,099 B2 | * | 2/2006 | Watanabe ............... | 219/121.78 |
| 2006/0021977 A1 | * | 2/2006 | Menegus ................ | 219/121.78 |

FOREIGN PATENT DOCUMENTS

| | | | |
|---|---|---|---|
| JP | 1-55076 | | 11/1989 |
| JP | 5-49396 | | 7/1993 |
| JP | 7-328786 A | * | 12/1995 |
| JP | 8-52587 A | * | 2/1996 |
| JP | 11-285886 A | * | 10/1999 |
| JP | 3084780 | | 7/2000 |
| JP | 2002-336979 A | * | 11/2002 |

* cited by examiner

*Primary Examiner*—Geoffrey S. Evans
(74) *Attorney, Agent, or Firm*—Thelen Reid Brown Raysman & Steiner LLP

(57) ABSTRACT

A laser processing apparatus has a first laser beam reversal apparatus which reverses the laser beam from the laser oscillator, and a second laser beam reversal apparatus which reverses the laser beam reversed by the first laser beam reversal apparatus, and guides the laser beam to the inside of the processing head, in which a first laser optical path which runs from the laser oscillator to the first laser beam reversal apparatus, a second laser optical path which runs form the first laser beam reversal apparatus to the second laser beam reversal apparatus, and a third laser optical path which runs from the second laser beam reversal apparatus to the processing head are parallel.

2 Claims, 5 Drawing Sheets

LASER PROCESSING METHOD

BACKGROUND OF THE INVENTION

1. Field of the Invention

The present invention relates to a laser processing apparatus in which a laser beam which is guided to the inside of a processing head by a laser oscillator is converged by a converging lens of the processing head, and is guided onto a material to be processed such as a metal plate, plastic plate, or the like, and thereby processing such as cutting, welding, or the like of the material to be processed is performed.

Priority is claimed on Japanese Patent Application No.2004-138324 filed May 7, 2004, the content of which is incorporated herein by reference.

2. Description of Related Art

Generally, a laser processing apparatus is known in which, using the laser beam, processing such as cutting, welding, or the like of a material to be processed is performed in order to form a predetermined shape of product.

Here, because a diameter of the laser beam changes according to an optical path length, that is, the diameter of the laser beam is increased according to increase of the optical path length, the optical path length from the laser oscillator to the processing head strongly affects to the processing performance in the case of the laser processing. Moreover, the optical path length which is needed differs according to parameters of the processing method such as whether nitrogen gas is used as an assist gas, whether oxygen gas is used as an assist gas, whether edge preparation is performed, and whether three dimensional processing in which a mirror is arranged under the converging lens is performed, and according to the quality of the material to be processed, for example iron or a soft steel material which is, for example stainless material, or the like, and according to the thickness of the material to be processed, and the like.

Therefore, a long optical path length may be needed according to the processing method, and the quality, the thickness, or the like of the material to be processed.

However, in laser processing, in order to prevent the laser processing apparatus from becoming large, generally, a compact size of laser processing apparatus corresponding to the size of the material to be processed is used, and thereby it is difficult for a long optical path length to be obtained.

In order to solve the above problem, and to obtain a long optical path length, generally, a laser processing apparatus which is provided with a laser light reversal apparatus by which the laser light from the laser oscillator is reversed, and then enters the processing head is known (see Patent Document 1: Japanese Examined Patent Application, Second Publication No. H1-55076).

However, in this laser processing apparatus, the laser light from the laser oscillator is reversed once, and enters the processing head, and therefore, the optical path length is restricted by the effective processing width of the laser processing apparatus, and increase of the optical path length is limited.

Because of this, due to the processing method, quality of the material, or thickness of the material to be processed, proper processing performance cannot to obtained, and in order to obtain proper processing performance with a short optical path length, for example, when a thin plate is processed, a converging lens whose focal length is short is needed, and it is necessary for the converging lens to be positioned near the thin plate, and so a problem occurs in which, the spatter (a melted part of the material to be processed) or hume (material which is melted and then solidified) which is scattered during processing adheres to the converging lens.

Moreover, in order to increase the optical path length, generally, a laser processing apparatus is known in which the laser oscillator and the reversal mirror body are arranged on the inside of a main frame, and the reversal mirror body is moved within the main frame, and thereby the optical path length is adjusted within the main frame, and the optical path length from the laser oscillator to the processing head can be changeably set to the proper optical path length according to change in the thickness or quality of the material to be processed (for example, see Patent Document 2: Japanese Patent No. 3084780).

Moreover, a laser processing apparatus is known in which the laser light emitted from the laser oscillator is reflected in a rail laying direction by a first reflection member, is reversely reflected in a direction parallel to the direction of the rail by a reversal apparatus, is reflected in the direction of a torch by the second reflection member, is condensed by a lens via a mirror which is provided at the torch, and is emitted onto the material to be processed, and the reversal apparatus is movable in the rail laying direction, and thereby the setting of the optical path length can changed (for example, see Patent Document 3: Japanese Examined Patent Application, Second Publication No. H5-49396).

However, in a laser processing apparatus of conventional technology in which a reversal mirror body is movable within the main frame, and thereby the optical path length within a main frame is adjusted, in order to increase the optical path length and to adjust the optical path length, it is necessary for a reversal mirror body which has a plurality of mirrors to be provided on the inside of the main frame in which the laser oscillator is provided, and a mechanism which renders the reversal mirror body movable is needed, and thereby the structure of the laser processing apparatus becomes complicated, and it becomes large in size. Especially, in order to prevent danger from the laser light, it is necessary for the structure of the reversal mirror body and the movement mechanism of the reversal mirror body to be extremely precise, and thereby the constitution thereof is complicated. Moreover, in this laser processing apparatus, after the laser light emitted from the laser oscillator is reflected in the vertical direction on the way, the laser light enters the processing head, and thereby the laser processing apparatus becomes large in size.

Moreover, in the laser processing apparatus of conventional technology in which the laser light emitted from the laser oscillator enters the torch via the first reflection member, reversal apparatus, and second reflection member, and the reversal apparatus for changing the optical path length is movable in the rail laying direction, it is necessary for the first reflection member to be provided at the backside of the laser oscillator. Further, in order to move the first reflection member, it is necessary to provide a holder, rail, or the like which is extended in the vertical direction with respect to the movement direction of the torch, and the constitution of the laser processing apparatus is complicated, and becomes large in size. Especially, in order to prevent danger from the laser light, it is necessary for the structure of the first reflection member and of the holder, rail, or the like of the first reflection member to be extremely precise, and thereby the constitution thereof is complicated. Moreover, because the material to be processed cannot be arranged under the first reflection member, a problem occurs in which the effective processing width of the laser processing apparatus becomes low.

SUMMARY OF THE INVENTION

The present invention solves the above-mentioned problems, and an object of the present invention is to provide a laser processing apparatus in which a long optical path length which is not restricted by effective processing width can be obtained, and the constitution of the apparatus is simplified and is prevented from becoming large in size.

The present invention is a laser processing apparatus in which a laser beam guided to an inside of a processing head from a laser oscillator is converged by a converging lens of the processing head, and is guided onto a material to be processed, and processing of the material to be processed is performed, having a first laser beam reversal apparatus which reverses the laser beam from the laser oscillator, and a second laser beam reversal apparatus which reverses the laser beam reversed by the first laser beam reversal apparatus, and guides the laser beam to the inside of the processing head, in which a first laser optical path which runs from the laser oscillator to the first laser beam reversal apparatus, a second laser optical path which runs form the first laser beam reversal apparatus to the second laser beam reversal apparatus, and a third laser optical path which runs from the second laser beam reversal apparatus to the processing head are parallel.

According to the present invention, because the first laser beam reversal apparatus and the second laser beam reversal apparatus are provided, by a simple constitution in which, for example, it is not necessary for a mirror and the like for increasing the optical path length to be arranged at the inside of the holder of the laser oscillator, optical path length is secured without limitation by the effective processing width of the laser processing apparatus, and for example, the proper optical path length according to the plate thickness, quality, processing method, or the like of the material to be processed can be secured.

Because the first laser optical path, the second laser optical path, and the third laser optical path are parallel, the processing head, the first laser beam reversal apparatus, and the second laser beam reversal apparatus can be arranged along the same axis, and therefore, for example, the processing head, the first laser beam reversal apparatus, and the second laser beam reversal apparatus can be provided in the same holder, and thereby it is possible to prevent the laser processing apparatus from becoming large in size or being complicated.

Moreover, in the present invention, the processing head, the first laser beam reversal apparatus, and the second laser beam reversal apparatus are movable in an axis parallel with respect to the first laser optical path, a position of the second laser beam reversal apparatus with respect to the processing head can be set at an arbitrary position, and in a state in which the position of the second laser beam reversal apparatus is set with respect to the processing head, as the processing head is moved, the first laser beam reversal apparatus may be movable at half speed with respect to the movement speed of the processing head in the same direction as a movement direction of the processing head, and the second laser beam reversal apparatus may be movable at the same speed as the movement speed of the processing head in the same direction as the movement direction of the processing head.

According to the present invention, because the position of the second laser beam reversal apparatus with respect to the processing head can be set at the arbitrary position, for example, the optical path length can be changed according to the plate thickness, the quality, the processing method, or the like of the material to be processed, so that it is not the case that, according to the plate thickness or the like of the material to be processed, a plurality of converging lenses need to be prepared, and the converging lens needs to be changed.

Moreover, because, as the processing head is moved, the first laser beam reversal apparatus is movable at half speed with respect to the movement speed of the processing head in the same direction as the movement direction of the processing head, and the second laser beam reversal apparatus is movable at the same speed as the movement speed of the processing head in the same direction as the movement direction of the processing head, even when the processing head is moved, and the processing of the material to be processed is performed, the optical path length can be kept at a constant length.

Moreover, in the present invention, when the second laser beam reversal apparatus reaches a movement limitation of the second laser beam reversal apparatus, the second laser beam reversal apparatus may be maintained in a stationary state, the movement of the processing head may be continued, and the first laser beam reversal apparatus may be movable at half speed with respect to the movement speed of the processing head in a reverse direction with respect to the movement direction of the processing head.

According to the present invention, even if the second laser beam reversal apparatus reaches the movement limitation of the second laser beam reversal apparatus, the same optical path length can be maintained, and the processing of the material to be processed by the processing head can be continued, the processing quality of the material to be processed can be maintained, and the effective processing width can be increased.

Moreover, in the present invention, when the first laser beam reversal apparatus reaches a movement limitation of the first laser beam reversal apparatus, the first laser beam reversal apparatus may be maintained in a stationary state, the movement of the processing head may be continued, and the second laser beam reversal apparatus may be movable at half speed with respect to the movement speed of the processing head in a same direction as the movement direction of the processing head.

According to the present invention, even if the first laser beam reversal apparatus reaches the movement limitation of the first laser beam reversal apparatus, the same optical path length can be maintained, and the processing of the material to be processed by the processing head can be continued, the processing quality of the material to be processed can be maintained, and the effective processing width can be increased.

Moreover, in the present invention, the processing head, the first laser beam reversal apparatus, and the second laser beam reversal apparatus may be movable in a parallel axis, and in a whole of an effective processing width of the processing head, the processing head, the first laser beam reversal apparatus, and the second laser beam reversal apparatus may be maintained at the same optical path length, and may be movable at a uniform speed ratio.

According to the present invention, even if the processing head approaches a movement limitation thereof as the processing head moves in one direction, because the movement directions and the movement speed of the first laser beam reversal apparatus and the second laser beam reversal apparatus are not changed, and the same optical path length is maintained, error in the movement action of the first laser beam reversal apparatus and the second laser beam reversal apparatus with respect to the movement action of the processing head does not occur, the movement action of the first laser beam reversal apparatus and the second laser beam reversal apparatus with respect to the movement action of the processing head can be carried out exactly, the constant optical path length can be always secured, and the processing quality of the material to be processed can be maintained.

Moreover, in the present invention, when the movement speed of the processing head is $V_0$, the movement speed of the first laser beam reversal apparatus is $V_1$, the movement speed of the second laser beam reversal apparatus is $V_2$, the effective processing width of the processing head is $L_M$, the optical path length which is set at an arbitrary length is L, and the minimum optical path length which can be set is Lm, and L-Lm is L', a movement speed ratio of the processing head, the first laser beam reversal apparatus, and the second laser beam reversal apparatus may be set so that the movement speed ratio satisfies $V_0:V_1:V_2=1:(1-L'/L_M)/2: (1-L'/2L_M)$.

According to the present invention, by adopting the above movement speed ratio, in a whole of an effective processing width of the processing head, the processing head, the first laser beam reversal apparatus, and the second laser beam reversal apparatus are maintained at the same optical path length, and can be movable at a uniform speed ratio.

Therefore, even if the processing head approaches the movement limitation thereof as the processing head moves the same direction, because the movement directions and the movement speed of the first laser beam reversal apparatus and the second laser beam reversal apparatus are not changed, and the same optical path length is maintained, error of the movement action of the first laser beam reversal apparatus and the second laser beam reversal apparatus with respect to the movement action of the processing head does not occur, the movement action of the first laser beam reversal apparatus and the second laser beam reversal apparatus with respect to the movement action of the processing head can be carried out exactly, the constant optical path length can be constantly secured, and the processing quality of the material to be processed can be maintained.

According to the present invention, because the first laser beam reversal apparatus and the second laser beam reversal apparatus are provided, by a simple constitution in which, for example, it is not necessary for a mirror, and the like for increasing the optical path length to be arranged on the inside of the holder of the laser oscillator, the optical path length is secured without limitation based on the effective processing width of the laser processing apparatus, and for example, the proper optical path length according to the plate thickness, the quality, the processing method, or the like of the material to be processed can be secured.

Because the first laser optical path, the second laser optical path, and the third laser optical path are parallel, the processing head, the first laser beam reversal apparatus, and the second laser beam reversal apparatus can be arranged along the same axis, and therefore, for example, the processing head, the first laser beam reversal apparatus, and the second laser beam reversal apparatus can be provided on the same holder, and thereby it is possible to prevent the laser processing apparatus from becoming large in size or being complicated.

DETAILED DESCRIPTION OF THE INVENTION

Hereinafter, a laser processing apparatus 1 according to an embodiment of the present invention is explained with reference to the figures.

In addition, although an example of a laser cutting apparatus is explained as part of the present embodiment of the present invention, for the laser processing apparatus 1 according to the present invention, as well as for the laser cutting apparatus, for example, a laser welding apparatus in which a carbonic acid gas laser, or the like is transmitted by a mirror can be used.

Figure 1:
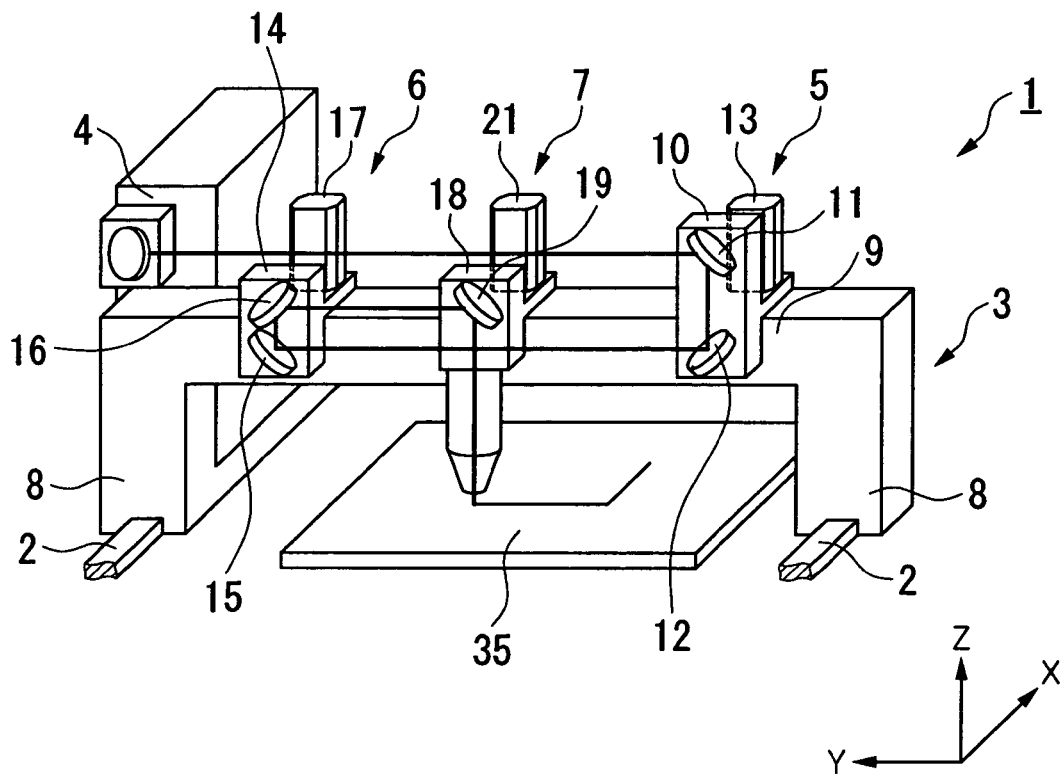
FIG. 1 is a perspective view which shows a laser processing apparatus according to a first embodiment of the present invention.

FIG. 1 shows the laser cutting apparatus 1 according to the first embodiment of the present invention.

The laser cutting apparatus 1 according to the present embodiment is provided with a pair of rails 2, a body frame 3, a laser oscillator 4, a first laser beam reversal apparatus 5, a second laser beam reversal apparatus 6, and a processing head 7.

The rails 2 are kept at a predetermined distance and are parallel with each other, and extend in X-axis.

The body frame 3 moves in the X-axis along the pair of rails 2.

The body frame 3 is composed of a pair of rail connection portions 8 which connect with the pair of rails 2, and a holder 9 which is supported over the pair of rail connection portions 8, and extends in the Y-axis.

The laser oscillator 4 emits the laser beam in a direction along the Y-axis. The laser oscillator 4 is fixed on either of the pair of rail connection members 8 of the body frame 3, and, as the body frame 3 moves in the X-axis, the laser oscillator 4 moves in the X-axis.

The first laser beam reversal apparatus 5 reverses the laser beam emitted from the laser oscillator 4, and guides it in the Y-axis.

The first laser beam reversal apparatus 5 is provided with a first reversal apparatus holder 10, a first reversal apparatus first mirror 11 and a first reversal apparatus second mirror 12 which are provided within the first reversal apparatus holder 10, and a servo motor 13 for the first laser beam reversal apparatus and a servo amplifier (not shown in the figures) for the first laser beam reversal apparatus which are provided on the first reversal apparatus holder 10.

The first reversal apparatus holder 10 is provided on the holder 9, and can be moved in the Y-axis along the holder 9.

The first reversal apparatus first mirror 11 reflects the laser beam emitted from the laser oscillator 4 in the Z-axis (downward). The first reversal apparatus second mirror 12 reflects the laser beam reflected by the first reversal apparatus first mirror 11 in the Y-axis (toward the laser oscillator 4).

The servo motor 13 for the first laser beam reversal apparatus and the servo amplifier for the first laser beam reversal apparatus control the movement direction, the movement amount, and the movement speed in the Y-axis of the first laser beam reversal apparatus 5.

The first laser beam reversal apparatus 5 has a movement limitation at the opposite side with respect to a side of the laser oscillator 4 of the holder 9 in the Y-axis.

The second laser beam reversal apparatus 6 reverses the laser beam from the first laser beam reversal apparatus 5, and guides the laser beam to the inside of the processing head 7.

The second laser beam reversal apparatus 6 is provided with a second reversal apparatus holder 14, a second reversal apparatus first mirror 15 and a second reversal apparatus second mirror 16 which are provided within the second reversal apparatus holder 14, and a servo motor 17 for the second laser beam reversal apparatus and a servo amplifier (not shown in the figures) for the second laser beam reversal apparatus which are provided on the second reversal apparatus holder 14.

The second reversal apparatus holder 14 is provided on the holder 9, and can be moved in the Y-axis along the holder 9.

The second reversal apparatus first mirror 15 reflects the laser beam reflected by the first laser beam reversal apparatus 5 in the Z-axis (upward). The second reversal apparatus second mirror 16 reflects the laser beam reflected by the second reversal apparatus first mirror 15 in the Y-axis (in the reverse direction with respect to the direction of the laser oscillator 4).

The servo motor 17 for the second laser beam reversal apparatus and the servo amplifier for the second laser beam reversal apparatus control the movement direction, the movement amount, and the movement speed in the Y-axis of the second laser beam reversal apparatus 6.

The second laser beam reversal apparatus 6 has a movement limitation at a side of the laser oscillator 4 of the holder 9 in the Y-axis.

In addition, in FIG. 1, the first laser beam reversal apparatus 5 and the second laser beam reversal apparatus 6 have a constitution in which they are long in the up and down directions (Z-axis), in the first laser beam reversal apparatus 5, the first reversal apparatus second mirror 12 is arranged at the lower part of the first reversal apparatus first mirror 11, and, in second laser beam reversal apparatus 6, the second reversal apparatus second mirror 16 is arranged at the upper part of the second reversal apparatus first mirror 15. However, in place of the constitution of FIG. 1, the first laser beam reversal apparatus 5 and the second laser beam reversal apparatus 6 can have a constitution in which they are long in the horizontal axis (X-axis). In such a case, in the first laser beam reversal apparatus 5, along the X-axis, the first reversal apparatus first mirror 11 and the first reversal apparatus second mirror 12 are arranged, and in the second laser beam reversal apparatus 6, along the X-axis, the second reversal apparatus first mirror 15 and the second reversal apparatus second mirror 16 are arranged.

In such a case, as in the constitution of FIG. 1, the laser beam emitted from the laser oscillator 4 reaches the processing head mirror 19 via the first reversal apparatus first mirror 11, the first reversal apparatus second mirror 12, the second reversal apparatus first mirror 15, and the second reversal apparatus second mirror 16 in turn.

The processing head 7 guides the laser beam from the second laser beam reversal apparatus 6 onto the material to be processed 35, and performs the processing of the material to be processed 35. The processing head 7 is provided on the holder 9, and is arranged between the first laser beam reversal apparatus 5 and the second laser beam reversal apparatus 6.

The processing head 7 is provided with a processing head holder 18, a processing head mirror 19 and a converging lens 20 which are provided at the inside of the processing head holder 18, and a processing head servo motor 21 and a processing head servo amplifier (not shown in the figures) which are provided on the processing head holder 18.

The processing head holder 18 is provided on the holder 9, and can be moved in the Y-axis along the holder 9. The processing head mirror 19 reflects the laser beam from the second laser beam reversal apparatus 6, and guides the laser beam in the Z-axis (downward). The converging lens 20 converges the laser beam reflected by the processing head mirror 19, and guides the laser beam onto the material 35 to be processed. The processing head servo motor 21 and the processing head servo amplifier control the movement direction, the movement amount, and the movement speed in the Y-axis of the processing head 7.

Because of the above constitution, in the embodiment of the present invention, the first laser optical path which runs from the laser oscillator 4 to the first laser beam reversal apparatus 5, the second laser optical path which runs form the first laser beam reversal apparatus 5 to the second laser beam reversal apparatus 6, and the third laser optical path which runs from the second laser beam reversal apparatus 6 to the processing head 7 are parallel.

Next, the motion of the laser processing apparatus 1 according to the first embodiment of the present invention is explained.

At the beginning, the body frame 3 is moved along the pair of rails 2, and the positioning of the body frame 3 in the X-axis is adjusted, the processing head servo motor 21 and the processing head servo amplifier are controlled, and thereby the processing head 7 on the holder 9 is moved, the positioning of the processing head 7 in the Y-axis is adjusted, and the processing head 7 is stopped at the processing start position of the material 35 to be processed.

Figure 2:
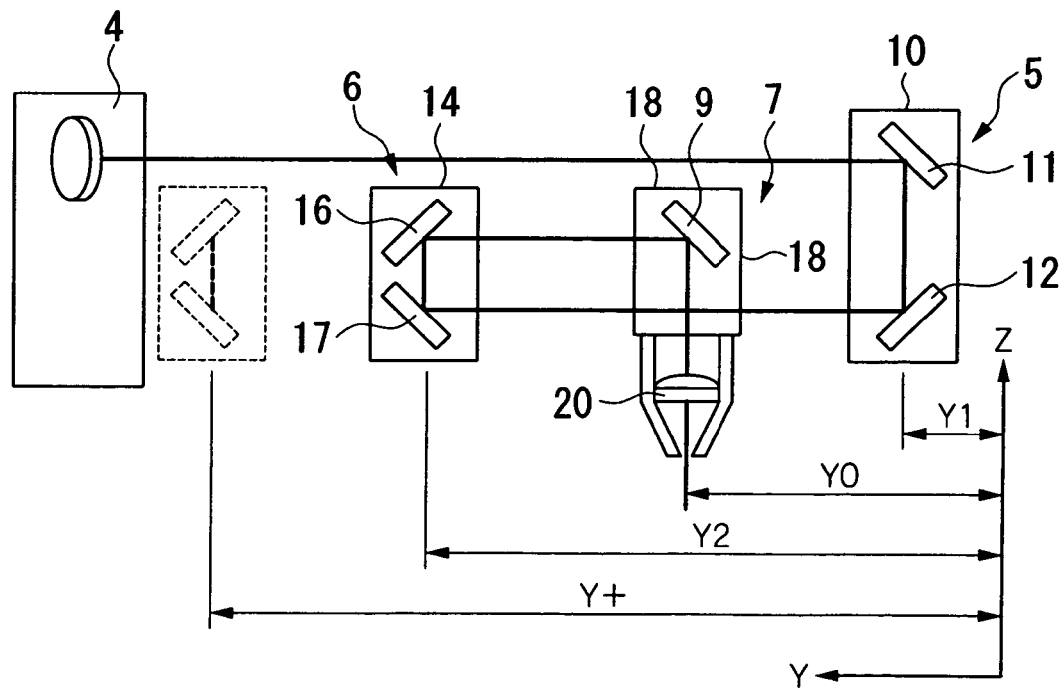
FIG. 2 is a schematic view which shows a laser processing apparatus according to a first embodiment of the present invention.

Then, on the holder 9, by controlling the servo motor 17 for the second laser beam reversal apparatus and the servo amplifier for the second laser beam reversal apparatus, the positioning of the second leaser beam reversal apparatus 6 with respect to the processing head 7 is adjusted, in accordance with circumstances, and by controlling the servo motor 13 for the first laser beam reversal apparatus and the servo amplifier for the first laser beam reversal apparatus, the positioning of the first laser beam reversal apparatus 5 with respect to the processing head 7 is also adjusted, and the optical path length is adjusted. In such a case, in FIG. 2, the processing head 7 is positioned at $Y_0$, the first laser beam reversal apparatus is positioned at $Y_1$, and the second laser beam reversal apparatus is positioned at $Y_2$.

Next, the processing of the material 35 to be processed by the laser beam of the laser processing apparatus 1 is started.

Processing of the material 35 to be processed in the X-axis is performed by moving the body frame 3 along the pair of rails 2, adjusting the position of the body frame 3 in the X-axis, and moving the processing head 7 in the X-axis.

Processing of the material 35 to be processed in the Y-axis is performed by controlling the processing head servo motor 21 and the processing head servo amplifier, and moving the processing head 7 with respect to the holder 9. According to the movement of the processing head 7 with respect to the holder 9, by controlling the servo motor 13 for the first laser beam reversal apparatus and the servo amplifier for the first laser beam reversal apparatus, the first laser beam reversal apparatus 5 is moved at half speed with respect to the movement speed of the processing head 7 in a same direction as a movement direction of the processing head 7, and by controlling the servo motor 17 for the second laser beam reversal apparatus and the servo amplifier for the second laser beam reversal apparatus, the second laser beam reversal apparatus 6 is movable at the same speed as the movement speed of the processing head 7 in the same direction as the movement direction of the processing head 7.

When the processing head 7 is moved toward the laser oscillator 4, the second laser beam reversal apparatus 6 eventually reaches the movement limitation (the position Y+ in FIG. 2) of the second laser beam reversal apparatus 6, the movement of the second laser beam reversal apparatus 6 is stopped, and the second laser beam reversal apparatus 6 is maintained in a stationary state. In such a case, the movement of the processing head 7 is continued, and by controlling the servo motor 13 for the first laser beam reversal apparatus and the servo amplifier for the first laser beam reversal apparatus, the first laser beam reversal apparatus 5 is movable at half speed with respect to the movement speed of the processing head 7 in a reverse direction with respect to the movement direction of the processing head 7.

Moreover, when the processing head 7 is moved in the direction away from the laser oscillator 4, the first laser beam reversal apparatus 5 reaches the movement limitation of the first laser beam reversal apparatus 5, the movement of the first laser beam reversal apparatus 5 is stopped, and the first laser beam reversal apparatus 5 is maintained in a stationary state. In such a case, the movement of the processing head 7 is continued, and by controlling the servo motor 17 for the second laser beam reversal apparatus and the servo amplifier for the second laser beam reversal apparatus, the second laser beam reversal apparatus 6 is moved at half speed with respect to the movement speed of the processing head 7 in the same direction (the direction away from the laser oscillator 4) as the movement direction of the processing head 7.

Next, the motion of the laser processing apparatus according to a second embodiment of the present invention is explained.

In the present embodiment, the same constitution as the constitution of FIG. 1 is adopted as the mechanical constitution of the laser processing apparatus 1.

As the motion of the laser processing apparatus 1, in a whole of an effective processing width of the processing head 7, the processing head 7, the first laser beam reversal apparatus 5, and the second laser beam reversal apparatus 6 are maintained at the same optical path length, and always move at a uniform speed ratio.

Thereby, compared with the above-mentioned first embodiment, even if the processing head 7 approaches the movement limitation thereof as the processing head 7 moves in one direction, because the movement directions of the first laser beam reversal apparatus 5 and the second laser beam reversal apparatus 6 are not changed, and the same optical path length is maintained, error in the movement action of the first laser beam reversal apparatus 5 and the second laser beam reversal apparatus 6 with respect to the movement action of the processing head 7 does not occur, the movement action of the first laser beam reversal apparatus 5 and the second laser beam reversal apparatus 6 with respect to the movement action of the processing head 7 can be carried out exactly, the constant optical path length can be always secured, and the processing quality of the material 35 to be processed can be maintained.

With reference to FIGS. 3 to 7, a case is explained in which, in a whole of the effective processing width of the processing head 7, the processing head 7, the first laser beam reversal apparatus 5, and the second laser beam reversal apparatus 6 are always moved at a uniform speed ratio.

Figure 3:
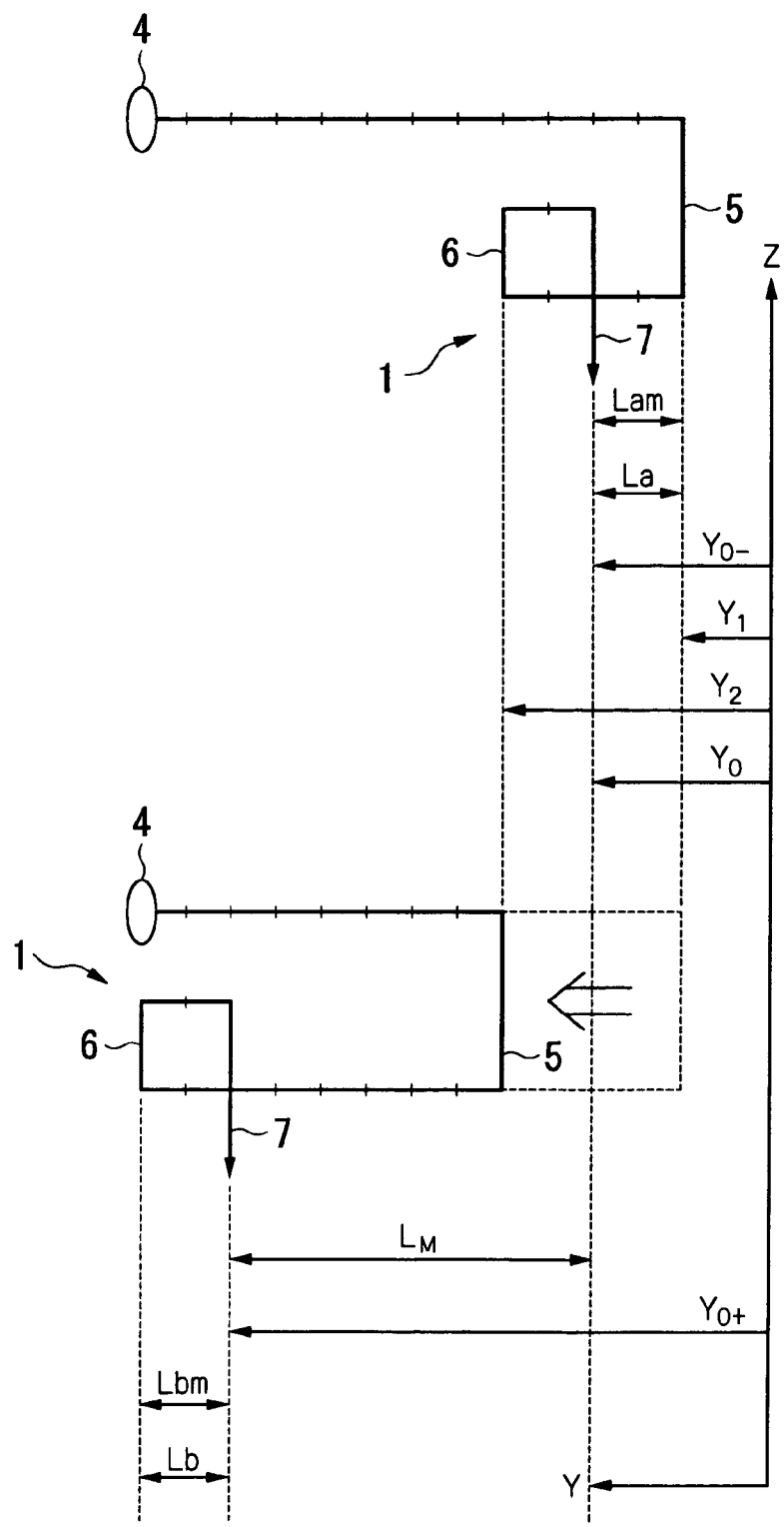
FIG. 3 is a schematic view which shows a laser processing apparatus according to a second embodiment of the present invention.

Here, first, the definition of the signs used in FIGS. 4 to 7 is explained with reference to FIG. 3.

The distance between the first laser beam processing apparatus 5 and the processing head 7: La.

The minimum of the distance between the first laser beam processing apparatus 5 and the processing head 7: Lam (the distance in the state in which the first reversal apparatus holder 10 and the processing head holder 18 are in contact with each other).

The distance between the second laser beam processing apparatus 6 and the processing head 7: Lb.

The minimum of the distance between the second laser beam processing apparatus 6 and the processing head 7: Lbm (the distance in the state in which the second reversal apparatus holder 14 and the processing head holder 18 are in contact with each other).

The Y-axis coordinate of the processing head 7: $Y_0$.

The position of the movement limitation in the −Y direction (the negative direction on the Y-axis) of the processing head 7: $Y_{0-}$.

The position of the movement limitation in the +Y direction (the positive direction on the Y-axis) of the processing head 7: $Y_{0+}$.

The effective processing width of the processing head 7: $L_M$ $(=Y_{0+}-Y_{0-})$.

The movement speed of the processing head 7: $V_0$.

The Y-axis coordinate of the first laser beam reversal apparatus 5: $Y_1$.

The movement speed of the first laser beam reversal apparatus 5: $V_1$.

The Y-axis coordinate of the second laser beam reversal apparatus 6: $Y_2$.

The movement speed of the second laser beam reversal apparatus 6: $V_2$.

The optical path length which is set at the arbitrary length: L (L is determined by the initial setting position of the second laser beam reversal apparatus 6 with respect to the processing head 7).

The minimum optical path length which can be set: Lm (in the case in which the initial setting is performed as Lb=Lbm).

The difference between L and Lm (L−Lm): L'.

In the case of being stated from the conclusion, when the laser processing apparatus 1 is set at the speed ratio of $V_0:V_1:V_2=1:(1-L'/L_M)/2: (1-L'/2L_M)$, in a whole of the effective processing width of the processing head 7, the processing head 7, the first laser beam reversal apparatus 5, and the second laser beam reversal apparatus 6 always move at a uniform speed ratio.

Moreover, in such a case, the coordinate of the processing head 7, the first laser beam reversal apparatus 5, and the second laser beam reversal apparatus 6 are as follows.

$$[Y_0, Y_1, Y_2] = [Y_0, \{1-L'/L_M\}Y_0/2 + \{1+L'/L_M\}Y_0/2 - Lam, \{1-L'/(2L_M)\}Y_0 + L'Y_0/(2L_M) + Lbm + L'/2]$$

Hereinafter, it is explained in detail how, when the speed ratio of $V_0:V_1:V_2 = 1:(1-L'/L_M)/2: (1-L'/2L_M)$ is set, in a whole of the effective processing width of the processing head 7, the processing head 7, the first laser beam reversal apparatus 5, and the second laser beam reversal apparatus 6 always move at a uniform speed ratio.

In the following explanation, as a matter of convenience in explaining, a case is used in which the position of the movement limitation in the +Y direction of the second laser beam reversal apparatus 6 is the same position as that of the laser oscillator 4. However, a similar explanation can be given for a case in which the position of the movement limitation toward the +Y direction of the second laser beam reversal apparatus 6 is positioned at the –Y side with respect to the position of the laser oscillator 4.

Figure 4:
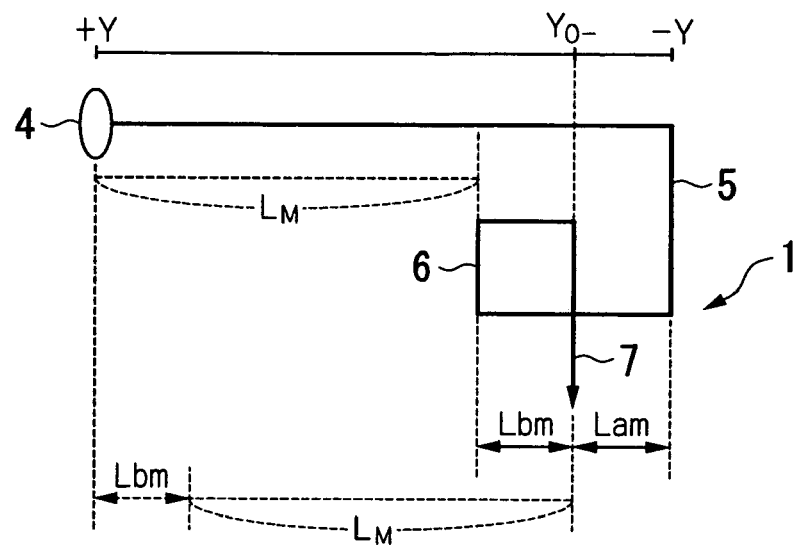
FIG. 4 is a schematic view which shows a laser processing apparatus according to a second embodiment of the present invention.
Figure 5:
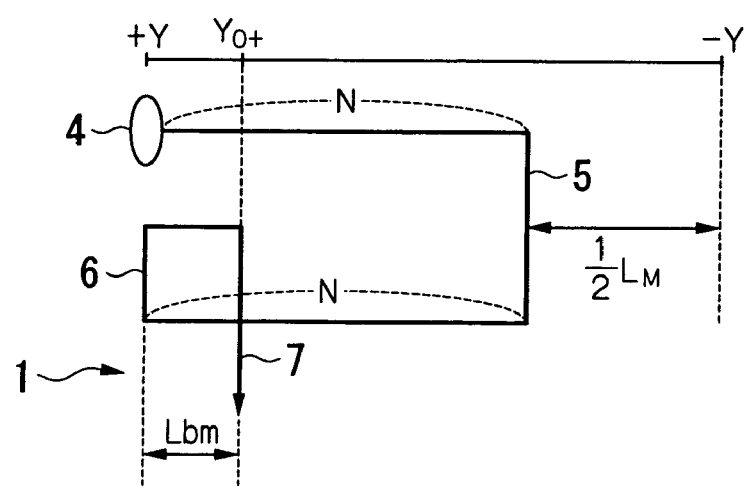
FIG. 5 is a schematic view which shows a laser processing apparatus according to a second embodiment of the present invention.

FIGS. 4 and 5 show the state of L=Lm (the state in which the second laser beam reversal apparatus 6 is initially set at the position in which the second laser beam reversal apparatus 6 has approached to the processing head 7 to the limit, and the second reversal apparatus holder 14 is in contact with the processing head holder 18).

In FIG. 4, the case of $Y_0 = Y_{0-}$ (the case in which the processing head 7 is positioned at the movement limitation in the –Y direction) is shown. In FIG. 5, the case is shown in which the processing head 7 moves through the whole of the length of the effective processing width in the +Y direction, and reaches the +Y of the movement limitation. Because the minimum of the distance between the processing head 7 and the second laser beam reversal apparatus 6 is the case in the state in which the processing head holder 18 and the second reversal apparatus holder 14 are in contact with each other, in the state of FIG. 4 and the state of FIG. 5, the distance between the processing head 7 and the second laser beam reversal apparatus 6 is the same. That is, the initial position of minimum distance of the second laser beam reversal apparatus 6 with respect to the processing head 7 is determined where the second reversal apparatus holder 14 is in contact with the processing head holder 18. Moreover, in the state in which the second laser beam reversal apparatus 6 and the processing head 7 are in contact with each other, the second laser beam reversal apparatus 6 reaches the movement limitation in the +Y direction at the same time as the second laser beam reversal apparatus 6 reaches the movement limitation in the +Y direction, and the movement limitation of the processing head 7 in the +Y direction is determined.

Thus, regarding the distance Lb between the second laser beam reversal apparatus 6 and the processing head 7, in the state in which the minimum thereof. Lbm is maintained, the second laser beam reversal apparatus 6 and the processing head 7 are moved from the state in FIG. 4 to the state in FIG. 5, and they reach the movement limitation in the +Y direction thereof.

In the case of FIG. 4, the distance of the first laser optical path is $L_M + Lbm + Lam$.

The reason therefor is that, because the position of the movement limitation in the +Y direction of the second laser beam reversal apparatus 6 is the same as the position of the laser oscillator 4, in FIG. 4, the second laser beam reversal apparatus 6 is apart from the laser oscillator 4 by the distance of $L_M$, and moreover, the limitation position in the –Y direction of the processing head 7 is determined where the processing head holder 18 is in contact with the first reversal apparatus holder 10 which is positioned at its limitation position in the –Y direction. The distance of the second laser optical path is Lbm+Lam, and the distance of the third laser optical path is Lbm.

As mentioned above, the optical path length in the state of FIG. 4 is the first laser optical path length+the second laser optical path length+the third laser optical path length, and the formula of $(L_M + Lbm + Lam) + (Lbm + Lam) + Lbm = L_M + 2Lam + 3Lbm$ is derived.

In the present invention, because the same optical path length is maintained when the processing head 7 is positioned at any position, the optical path length in the state of FIG. 5 is the same as the optical path length in the state of FIG. 4.

Here, since the distance of the third laser optical path in the state of FIG. 5 is Lbm, and the distance of the first laser optical path and the distance of the second laser optical path are the same, these distances are defined as N.

Figure 6:
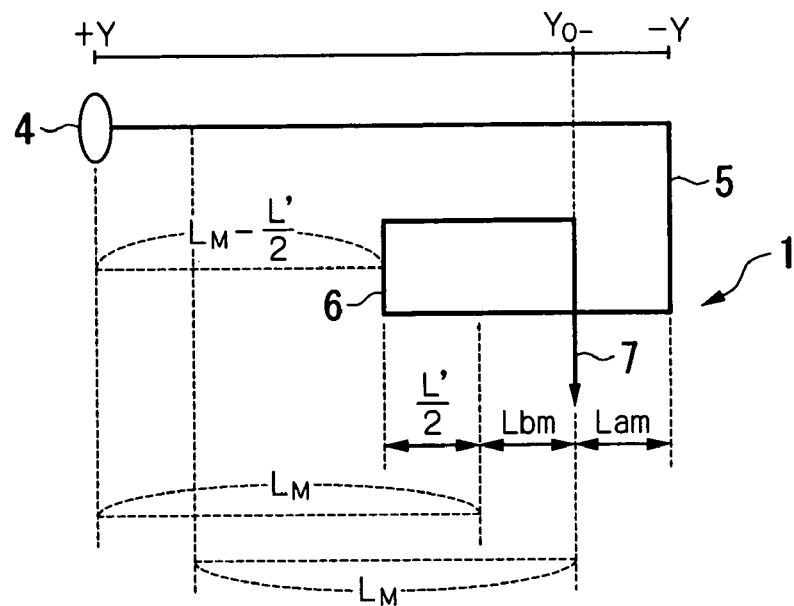
FIG. 6 is a schematic view which shows a laser processing apparatus according to a second embodiment of the present invention.

The optical path length in FIG. 6 becomes $L_M + 2Lam + 3Lbm = 2N + Lbm$, and the formula of $N = \frac{1}{2}L_M + Lam + Lbm$ is derived. In view of the first laser optical path in FIG. 4 and FIG. 5, the movement distance of the first laser beam reversal apparatus 5 is found by the formula of $(L_M + Lbm + Lam) - N = \frac{1}{2}L_M$.

Figure 7:
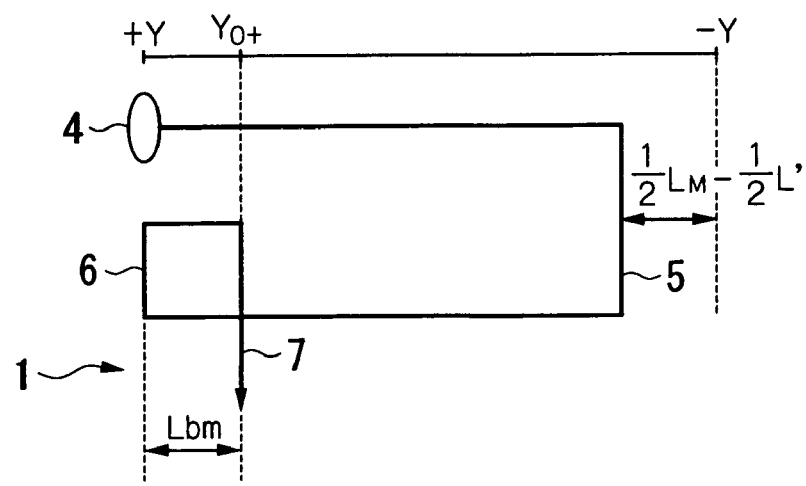
FIG. 7 is a schematic view which shows a laser processing apparatus according to a second embodiment of the present invention.

FIGS. 6 and 7 show the case of L>Lm (the case in which an initial setting of Lb>Lbm is performed).

In FIG. 6, a case of $Y_0 = Y_{0-}$ (the case in which the processing head 7 is positioned at –Y movement limitation) is shown. In FIG. 7, a case is shown in which the processing head 7 moves through the whole of the length of the effective processing width in the +Y direction from the state of FIG. 6, and reaches the +Y movement limitation.

In the case of FIG. 6, because the optical path length is longer than in the above-mentioned case of FIG. 4 in the length of L', in view of having the same distance of the first laser optical path, the second laser optical path and the third laser optical path are lengthened for the same distance, in the case of FIG. 6, as compared with the case of FIG. 4, and it is necessary for the second laser beam reversal apparatus 6 to be apart from the laser oscillator 4 by the distance of L'/2 (in this case, the distance between the processing head 7 and the second laser beam reversal apparatus 6 becomes Lbm+L'/2). Moreover, in the case of FIG. 6, the position of the processing head 7 and the first laser beam reversal apparatus 5 is the same as in the case of FIG. 4.

Although, in the state of FIG. 6, the movement of the processing head 7, the first laser beam reversal apparatus 5, and the second laser beam reversal apparatus 6 is started, and these enter the state of FIG. 7 at the same time, in the present invention, the optical path length in FIG. 6 and the optical path length in FIG. 7 are the same.

In the case in which the movement is performed from the state of FIG. 6 to the state of FIG. 7, the movement distance of the processing head 7 is $L_M$.

In the case in which the movement is performed from the state of FIG. 6 to the state of FIG. 7, because the movement distance of the second laser beam reversal apparatus 6 is shorter than the movement distance ($L_M$) of the case of L=Lm (the case of Lb=Lbm) in FIGS. 4 and 5 for the distance of L'/2, the movement distance of the second laser beam reversal apparatus 6 becomes $L_M - L'/2$.

In the case in which the movement is performed from the state of FIG. 6 to the state of FIG. 7, the movement distance of the first laser beam reversal apparatus 5 is as follows.

That is, the optical path length in the state of FIG. 7 is longer than the optical path length in the state of FIG. 5 for the length of L'.

In the state of FIG. 5 and the state of FIG. 7, the distance of the third laser optical path is the same (Lbm).

Therefore, in the state of FIG. 7, as compared with the state of FIG. 5, the distance of the first laser optical path and the distance of the second laser optical path are lengthened for the same distance, the position of the first laser beam reversal apparatus 5 in the state of FIG. 7 is moved in the −Y direction for the length of L'/2 with respect to the position of the first laser beam reversal apparatus 5 in the state of FIG. 5. For this reason, the movement distance of the first laser beam reversal apparatus 5 in the case of movement from the state of FIG. 6 to the state of FIG. 7 is shorter than the movement distance of the first laser beam reversal apparatus 5 in the case of movement from the state of FIG. 4 to the state of FIG. 5 for the length of L'/2.

Therefore, in the case of movement from the state of FIG. 6 to the state of FIG. 7, the movement distance of the first laser beam reversal apparatus 5 becomes ½$L_M$−L'/2.

As will be comprehended from the above-mentioned explanation, when the processing head 7 is moved from the −Y end portion to the +Y end portion (when the processing head 7 is moved through the whole of the effective processing width), the processing head 7 is moved for the length of $L_M$, the first laser beam reversal apparatus 5 is moved for the length of ½$L_M$−L'/2, and the second laser beam reversal apparatus 6 is moved for the length of $L_M$−L'/2. Because the start time and the finish time of these movement are the same, the speed ratio of $V_0:V_1:V_2$=1:(1−L'/$L_M$)/2: (1−L'/2$L_M$) is derived.

That is, when the processing head 7, the first laser beam reversal apparatus 5, and the second laser beam reversal apparatus 6 are moved at this speed ratio, a constant optical path length can be always maintained in the whole effective processing width of the processing head 7.

Figure 8:
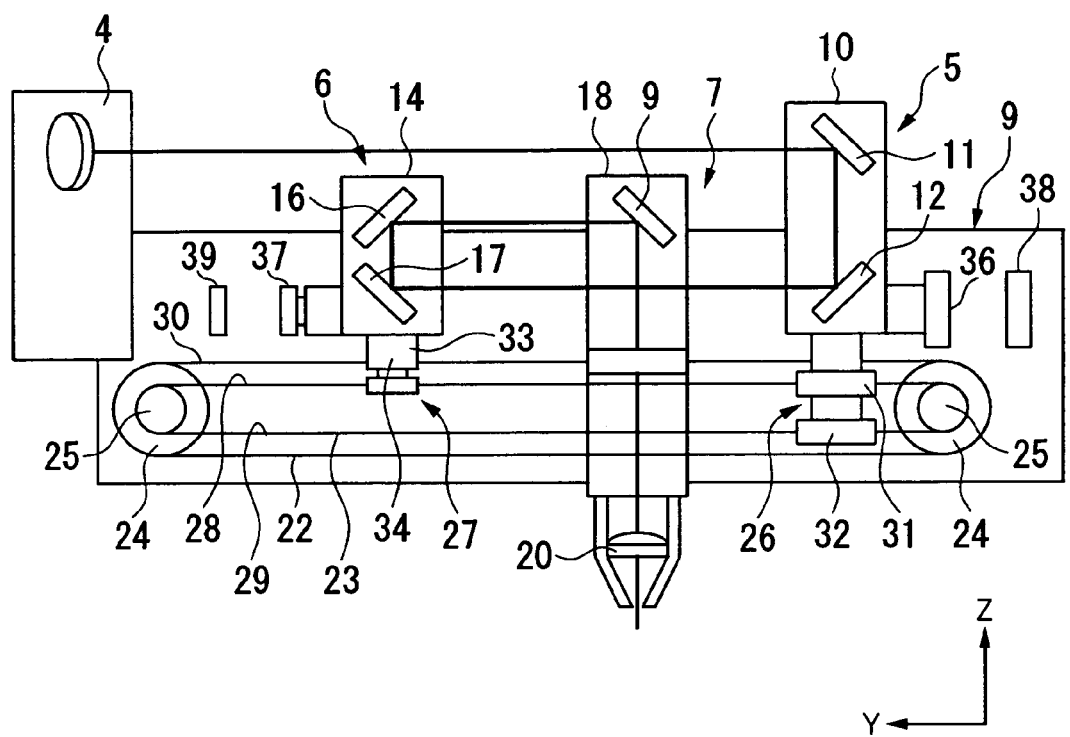
FIG. 8 is a schematic view which shows a laser processing apparatus according to a third embodiment of the present invention.

Next, the laser processing apparatus 1 according to the third embodiment of the present invention is explained with reference to FIG. 8.

The feature which is different between the laser processing apparatus 1 according to the present embodiment and the laser processing apparatus 1 according to the first embodiment of the present invention is described hereinafter.

That is, in the laser processing apparatus 1 according to the present embodiment, the processing head servo motor 21 and the processing head servo amplifier, the servo motor 13 for the first laser beam reversal apparatus and the servo amplifier for the first laser beam reversal apparatus, as well as, the servo motor 17 for the second laser beam reversal apparatus and the servo amplifier for the second laser beam reversal apparatus, which are provided in the laser processing apparatus 1 according to the first embodiment of the present invention, are not provided. Instead of these members, in the laser processing apparatus 1 according to the present embodiment, a first continuous belt 22, a second continuous belt 23, a pair of first supporting axels 24, a pair of second supporting axels 25, a first clamp body 26 and a first fixing clamp portion 36 which are provided to the first laser beam reversal apparatus 5, and a second clamp body 27 and a second fixing clamp portion 37 which are provided to the second laser beam reversal apparatus 6 are provided.

The first continuous belt (the first transportation member) 22 is installed on the pair of first supporting axels 24, extends in the Y-axis, and, according to rotation in one direction and a reverse direction thereof of the pair of first supporting axels 24, rotates in one direction and the reverse direction thereof. The pair of first supporting axels 24 are supported by the holder 9.

The second continuous belt (the second transportation member) 23 is installed on the pair of second supporting axels 25, extends in the Y-axis, and, according to the rotation in one direction and a reverse direction thereof of the pair of the second supporting axels 25, can rotate in one direction and the reverse direction thereof. The pair of second supporting axels 25 are supported by the holder 9. The second continuous belt 23 rotates at half speed with respect to the speed of the first continuous belt 22. The second continuous belt 23 is provided with a one direction movement portion 28 which is an upper side movement portion, and a reverse direction movement portion 29 which is a lower side movement portion.

One of the first supporting axels 24 and one of the second supporting axels 25 are integrally formed, and integrally rotated, and the other of the first supporting axels 24 and the other of the second supporting axels 25 are integrally formed, and integrally rotated. Each of the pair of first supporting axles 24 has a larger diameter than each of the pair of second supporting axels 25, and thereby the first continuous belt 22 rotates at double speed with respect to the rotation speed of the second continuous belt 23.

The processing head 7 is connected to the upper side movement portion 3 of the first continuous belt 22, and is fixed thereto.

The first clamp body 26 which is provided at the first laser beam reversal apparatus 5 is provided with an upper side clamp portion 31 of the first clamp body which is connected to the one direction movement portion 28 of the second continuous belt 23, and a lower side clamp portion 32 of the first clamp body which is connected to the reverse direction movement portion 29, and is controlled so that the first clamp body 26 can be in any one state among the state in which the first clamp body 26 is connected to the one direction movement portion 28 of the second continuous belt 23, the state in which the first clamp body 26 is connected to the reverse direction movement portion 29 of the second continuous belt 23, and the state in which the first clamp body 26 is not connected to the first continuous belt 22 or the second continuous belt 23. The first fixing clamp portion 36 is provided at the first laser beam reversal apparatus 5 perpendicularly with respect to the first clamp body 26, and when the first clamp body 26 enters the state in which the first clamp body 26 is not connected to the first continuous belt 22 or the second continuous belt 23, at the same time, the first fixing clamp 36 is connected to the first fixing member 38 which is attached to the holder 9. By such connection, the first laser beam reversal apparatus 5 is maintained in a position fixed state with respect to the holder 9.

The second clamp body 27 which is provided at the second laser beam reversal apparatus 6 is provided with an upper side clamp portion 33 of the second clamp body which is connected to the upper side movement portion 30 of the first continuous belt 22, a lower side clamp portion 34 of the second clamp body which is connected to the one direction movement portion 28 of the second continuous belt 23, and is controlled so that the second clamp body 27 can be in any one state among the state in which the second clamp body 27 is connected to the upper side movement portion 30 of the first continuous belt 22, the state in which the second clamp body 27 is connected to the one direction movement portion 28 of the second continuous belt 23, and the state in which the second clamp body 27 is not connected the first continuous belt 22 or the second continuous belt 23. The second fixing clamp portion 37 is provided at the second laser beam reversal apparatus 6 perpendicularly with respect to the second clamp body 27, and when the second clamp body 27 enters the state in which the second clamp body 27 is not connected to the first continuous belt 22 or the second continuous belt 23, at the same time, the second fixing clamp 37 is connected to the second fixing member 39 which is attached to the holder 9. By such connection, the second laser beam reversal apparatus 6 is maintained in a position fixed state with respect to the holder 9.

The connecting position in the Y-axis of the second clamp body 27 which is provided at the second laser beam reversal apparatus 6 with respect to the first continuous belt 22 can be set at an arbitrary position by an operation of the operation portion which is not in the figures.

The laser processing apparatus 1 according to the present embodiment is controlled as follows.

That is, when the first laser beam reversal apparatus 5 and the second laser beam reversal apparatus 6 have not reached the movement limitations thereof, the upper side clamp portion 31 of the first clamp body of the first laser beam reversal apparatus 5 is connected to the one direction movement portion 28, and the upper side clamp portion 33 of the second clamp body of the second laser beam reversal apparatus 6 is connected to the upper side movement portion 30 of the first continuous belt 22.

When the second laser beam reversal apparatus 6 reaches the movement limitation thereof, the upper side clamp portion 31 of the first clamp body of the first laser beam reversal apparatus 5 is released, and the lower side clamp portion 32 of the first clamp body is connected to the reverse direction movement portion 29. Moreover, the second laser beam reversal apparatus 6 is in the state in which the second laser beam reversal apparatus 6 is not connected to the first continuous belt 22 or the second continuous belt 23, and the second fixing clamp portion 37 is connected to the second fixing member 39, and thereby the second laser beam reversal apparatus 6 enters the position fixed state. The movement of the processing head 7 in the laser oscillator 4 is continued.

When the first laser beam reversal apparatus 5 reaches the movement limitation thereof, the first laser beam reversal apparatus 5 is in the state in which the first laser beam reversal apparatus 5 is not connected to the first continuous belt 22 or the second continuous belt 23, and the first fixing clamp portion 36 is connected to the first fixing member 38, and thereby the first laser beam reversal apparatus 5 enters the position fixed state. The second clamp body 27 of the second laser beam reversal apparatus 6 is connected to the one side direction movement portion 28. The movement of the processing head 7 toward the laser oscillator 4 is continued.

In addition, although, in the embodiment of the present invention, a laser processing apparatus 1 is described in which the first laser optical path, the second laser optical path, and the third laser optical path extend in the Y-axis, and the laser oscillator 4, the first laser beam reversal apparatus 5, and the second laser beam reversal apparatus 6 move in the Y-axis, according to the present invention, a laser processing apparatus 1 can be also provided in which the laser optical paths are extended in the X-axis or the Z-axis, not the Y-axis, and the laser oscillator 4, the first laser beam reversal apparatus 5, and the second laser beam reversal apparatus 6 are moved in the X-axis or in the Z-axis.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A method for controlling a laser processing apparatus in which a laser beam guided to an inside of a processing head from a laser oscillator is converged by a converging lens of said processing head, and is guided onto a material to be processed, and processing of said material to be processed is performed, a first laser beam reversal apparatus which reverses said laser beam from said laser oscillator, and a second laser beam reversal apparatus which reverses said laser beam reversed by said first laser beam reversal apparatus, and guides said laser beam to the inside of said processing head are provided, a first laser optical path which runs from said laser oscillator to said first laser beam reversal apparatus, a second laser optical path which runs from said first laser beam reversal apparatus to said second laser beam reversal apparatus, and a third laser optical path which runs from said second laser beam reversal apparatus to said processing head are parallel, and a position of said laser beam reversal apparatus with respect to said processing head is set at an arbitrary position, wherein said processing head, said first laser beam reversal apparatus, and said second laser beam reversal apparatus move in an axis parallel with respect to said first laser optical path, in a state in which the position of said second laser beam reversal apparatus is set with respect to said processing head, as said processing head is moved, said first laser beam reversal apparatus moves at half speed with respect to movement speed of said processing head in the same direction as a movement direction of said processing head, said second laser beam reversal apparatus moves at the same speed as the movement speed of said processing head in the same direction as the movement direction of said processing head, and when said second laser beam reversal apparatus reaches a movement limitation of said second laser beam reversal apparatus, said second laser beam reversal apparatus is maintained in a stationary state, the movement of said processing head is continued, and said first laser beam reversal apparatus moves at half speed with respect to the movement speed of said processing head in a reverse direction with respect to the movement direction of said processing head, and when said first laser beam reversal apparatus reaches a movement limitation of said first laser beam reversal apparatus, said first laser beam reversal apparatus is maintained in a stationary state, the movement of said processing head is continued, and said second laser beam reversal apparatus moves at half speed with respect to the movement speed of said processing head in the same direction as the movement direction of said processing head.

2. A method for controlling a laser processing apparatus in which a laser beam guided to an inside of a processing head from a laser oscillator is converged by a converging lens of said processing head, and is guided onto a material to be processed, and processing of said material to be processed is performed, a first laser beam reversal apparatus which reverses said laser oscillator, and a second laser beam reversal apparatus which reverses said laser beam reversed by said first laser beam reversal apparatus, and guides said laser beam to the inside of said processing head are provided, and a first laser optical path which runs from said laser oscillator to said first laser beam reversal apparatus, a second laser optical path which runs from said first laser beam reversal apparatus to said second laser beam reversal apparatus, and a third laser optical path which runs from said second laser beam reversal apparatus to said processing head are parallel, wherein said processing head, said first laser beam reversal apparatus, and said second laser beam reversal apparatus move in an axis parallel with respect to said first laser optical path, and when a movement speed of said processing head is $V_0$, a movement speed of said first laser beam reversal apparatus is $V_1$, a movement speed of said second laser beam reversal apparatus is $V_2$, an effective processing width of said processing head is $L_M$, an optical path length which is set at an arbitrary length is L, a minimum optical path length which can be set is Lm, and L-Lm is L', a movement speed ratio of said processing head, said first laser beam reversal apparatus, and said second laser beam reversal apparatus is set so that the movement speed ratio satisfies $V_0:V_1:V_2=1:(1-L'/L_M)/2:(1-L'/2L_M)$.

* * * * *